US006576876B2

(12) United States Patent
Cartossi

(10) Patent No.: US 6,576,876 B2

(45) Date of Patent: Jun. 10, 2003

(54) STAINLESS STEEL COOKING UTENSIL WITH COMPOSITE CAPSULAR BASE HEATABLE BY MAGNETIC INDUCTION

(75) Inventor: Walter Cartossi, Baveno (IT)

(73) Assignee: Inoxia, S.r.l., Domodossola (IT)

(*) Notice: Subject to any disclaimer, the term of this patent is extended or adjusted under 35 U.S.C. 154(b) by 0 days.

(21) Appl. No.: 09/999,479

(22) Filed: Oct. 31, 2001

(65) Prior Publication Data

US 2002/0092428 A1 Jul. 18, 2002

(30) Foreign Application Priority Data

Nov. 2, 2000 (IT) ........................................ MI00A2372

(51) Int. Cl.[7] ................................................ H05B 6/12

(52) U.S. Cl. ...................................... 219/621; 219/628

(58) Field of Search ................................ 219/621, 628, 219/620, 622, 624, 625, 618, 647, 649; 126/246, 400, 390.1; 99/DIG. 14, 451, 403; 220/611, 626; 428/653

(56) References Cited

U.S. PATENT DOCUMENTS 4,167,606 A * 9/1979 Ulam ......................... 428/653
4,350,259 A * 9/1982 Cartossi ...................... 220/611
4,596,236 A * 6/1986 Eide ........................... 219/621
4,705,727 A 11/1987 Hunter ....................... 428/653
5,487,329 A * 1/1996 Fissler ......................... 99/403
5,532,461 A * 7/1996 Crummenauer et al. .... 219/621
5,881,635 A 3/1999 Müller ........................ 99/403

FOREIGN PATENT DOCUMENTS

| | | |
|---|---|---|
| DE | 3634841 | 4/1988 |
| DE | 19500250 | 7/1996 |
| DE | 29605895 | 7/1996 |
| EP | 0651961 | 5/1995 |
| GB | 1329522 | 7/1971 |

* cited by examiner

*Primary Examiner*—Teresa Walberg
*Assistant Examiner*—Quang Van
(74) *Attorney, Agent, or Firm*—Steinberg & Raskin, P.C.

(57) ABSTRACT

The stainless steel cooking utensil (10; 10A) with a capsular base having a stainless steel cap (20) and also at least one additional metal cap (24; 24, 28). At least one of the caps (20, 24; 20, 24, 28) is of a metal of high magnetic permeability, the one additional cap (24) being drawn over the traditional cap (20), each of the other additional caps (28) being drawn at least over that adjacent additional cap (24) closer to the traditional cap (20). The additional caps (24, 28) can be permanently fixed to each other and to the traditional cap (20).

13 Claims, 3 Drawing Sheets

16
12
10
18
14
20
24
22

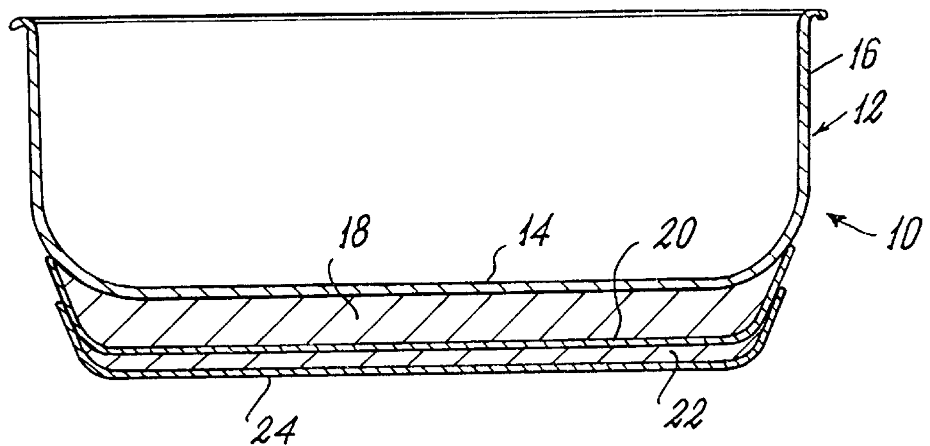
FIG. 1
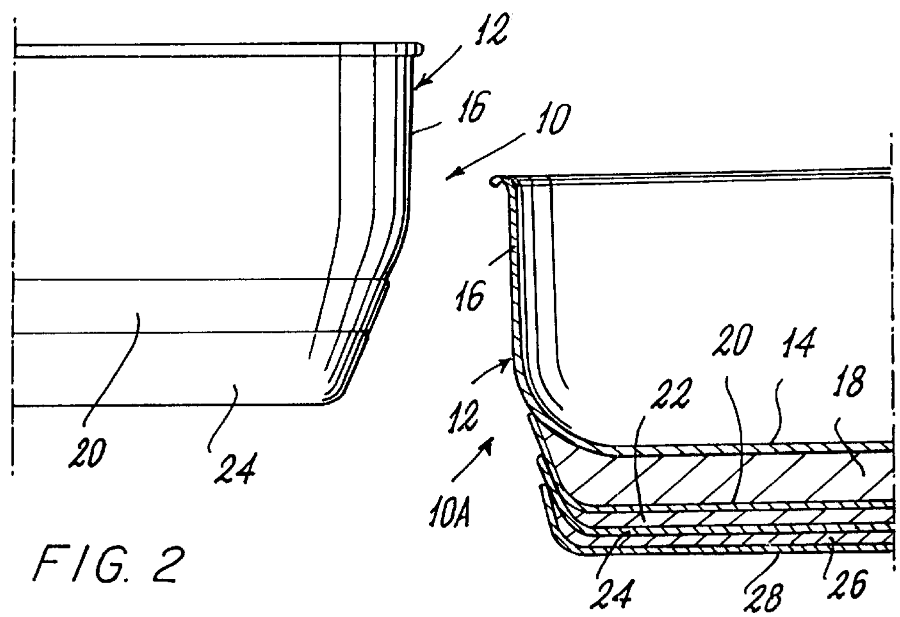
FIG. 2
FIG. 3

STAINLESS STEEL COOKING UTENSIL WITH COMPOSITE CAPSULAR BASE HEATABLE BY MAGNETIC INDUCTION

FIELD OF THE INVENTION

The present invention relates to stainless steel cooking utensils provided with a so-called "capsular" base, and more particularly to the utensils of this type heatable by utilizing the phenomenon of magnetic induction.

BACKGROUND OF THE INVENTION

From the time that stainless steel cooking utensils first appeared, although they offered numerous advantages over traditional cooking utensils, it was immediately obvious that they presented the not inconsiderable drawback that, when placed on a heat source, sufficiently uniform heat distribution over their entire base was not achieved, the temperature within their base being significantly higher in those regions of the base in direct contact with the heat source, compared with their other regions.

To obviate this drawback it was attempted to externally clad the base of the utensil with a layer of a metal having good thermal conductivity (in practice aluminium or copper). This was achieved historically in a simple, practical and low-cost manner by the procedure described in IT-A-965732. This procedure essentially consists of: centrally positioning a circular plate of suitable thickness and diameter of a metal of good thermal conductivity (preferably aluminium) on the outer face of the base of the actual utensil; heating the combination to a temperature close to but less than the melting point of the plate; and applying to the combination an adequate pressure (preferably an impact pressure) to enable a permanent connection to be obtained between the constituent parts of the base of the utensil obtained in this manner.

Although this solution achieves good heat distribution over the entire base of the utensil, it has the drawback that after a short time the outer surface of the aluminium or copper layer assumes an unpleasant appearance, the original appearance being restored only by a long and tiring cleaning operation.

To overcome this drawback it was attempted to completely clad the outer layer of good thermal conductivity metal with a thin layer of stainless steel or a "cap" which is easily cleanable, although it is not one of the higher thermal conductivity materials. However as this layer is very thin, it does not significantly hinder heat transfer and distribution.

Cooking utensils of this type are known in the sector as capsular base utensils in the sense that the layer of good thermal conductivity material is completely enclosed between the stainless steel base of the actual utensil and said outer stainless steel "cap".

The currently almost universally used procedure for producing a cooking utensil of this type in a simple and practical manner and which also ensures perfect mutual adhesion of the various components of the capsular base of the utensil derives from that described in IT-A-965732, i.e. by using pressure heating. To this latter procedure there is added a stage consisting of centrally positioning on said aluminium plate a cap of thin stainless steel sheet, then heating the combination to a temperature close to but less than the melting point of the metal of the plate.

Some time ago it was realized that significant energy savings in food cooking could be achieved by providing a cooking utensil with a base of a metal (in particular a type of stainless steel) of high magnetic permeability and placing this utensil over a device able to generate an adequate magnetic field (the heating occurring by magnetic induction).

It was therefore attempted to make cooking utensils with a capsular base heatable by magnetic induction, by simply using for their base an outer cap obtained from a stainless steel sheet of high magnetic permeability (it should be noted that the stainless steel traditionally used for making cooking utensils has a low magnetic permeability), and which would not prevent these cooking utensils from being heated by a traditional heat source. However the resultant utensils presented the serious drawback that the cap of high magnetic permeability stainless steel (for example AISI 430) underwent considerable deformation or warping even during manufacture, and this subsequently increased as a result of the repeated heating to which the utensil is subjected during its use, to the extent that the cap could partially or totally separate.

OBJECTS AND SUMMARY OF THE INVENTION

The object of the present invention is therefore to provide a stainless steel cooking utensil with a capsular base, which can be heated by magnetic induction without however presenting the drawback of known utensils of this type.

This object is attained by the stainless steel cooking utensil of the present invention, characterised in that the capsular base comprises not only the traditional stainless steel cap but also at least one additional metal cap, at least one of the caps being of a metal of high magnetic permeability, one additional cap being drawn over the traditional cap, each of the other additional caps being drawn at least over the adjacent additional cap closer to the traditional cap, means being provided to permanently fix the additional caps together and to the traditional cap.

It has been surprisingly found that a cooking utensil formed in this manner with one or more additional caps, of which at least one is of stainless steel of high magnetic permeability, does not present the aforedescribed drawbacks of known cooking utensils heatable by magnetic induction. In this respect, precisely because the high magnetic permeability stainless steel layer or layers forming one of the caps are of cup shape and are intimately connected to at least one cap adjacent to them, the utensil base, even after prolonged use of the utensil, does not present appreciable distortion or warping to an extent such as to compromise its use or significantly reduce the efficiency of its heating by magnetic induction.

It is important to note that if several additional caps are provided, except for at least one (which necessarily must be of a high magnetic permeability metal), the remaining additional caps can be of metals not of high magnetic permeability, such as copper, silver or titanium, or even the usual stainless steel for cooking utensils.

Conveniently the additional cap or caps of high magnetic permeability are the most outer, in order to achieve high heating efficiency by magnetic induction. However the opposite situation is not to be excluded, in the sense that the most inner cap, in the limit the traditional cap, can be of a high magnetic permeability metal, whereas the most outer cap can be of a low magnetic permeability metal. For example, for appearance reasons or to immediately obtain a more uniform heat distribution, the most outer cap can be of copper or silver, or titanium (which has a corrosion resistance considerably higher than high magnetic permeability stainless steel which, as is well known, corrodes more easily than the stainless steel of low magnetic permeability used for common cooking utensils, and of which the actual utensil is made). In this lafter case the most outer cap of low magnetic permeability metal can conveniently have the smallest possible thickness, both for weight reasons and because this enables a higher magnetic induction heating efficiency to be achieved.

If a procedure similar to that described in DE-C-2258795 is used to join the additional cap to the traditional cap to form the utensil of the invention, but the metal of the caps is not such as to enable the caps to be joined together by the aforesaid manufacturing procedure, the aforesaid fixing means between the caps will consist of a relative layer of a metal having a melting point lower than that of the two caps to be joined together, the layer of fixing metal being interposed between them and joining them together by implementing the aforesaid utensil manufacturing procedure. It is however opportune to note that to manufacture the capsular base of the utensil of the present invention, it is not necessary to use the known pressure heating method, as the various caps could be joined together buy simple brazing. In this case the intermediate layer of material of lower melting point than the adjacent caps is the brazing material (welding alloy) itself.

It should also be noted that the most outer additional cap (which can even be the only additional cap) can have through apertures to provide an aesthetic effect, as they enable the underlying material to be seen. If made in a cap of high magnetic permeability metal, these through apertures will conveniently have positions and dimensions such as not to significantly penalize the induction heating efficiency. It should be noted that even if the material below the most outer cap has an appearance similar to that of the cap material and said method is used to manufacture the capsular base, an aesthetic effect is in any event obtained, due to the pattern of the slightly hollowed but well visible line (similar to a line obtained by incision) which forms along the outline of said through notches, apertures or holes.

It should be further noted that these through apertures can be filled with metal strips of equal plan shape and dimensions, but of a metal different from that of the sheet used for the outer cap, this enabling special decorative effects to be obtained (which can also serve to distinguish the production of a determined manufacturer from another).

The additional cap or caps normally have a circular outer edge lying in one plane. However this edge, although being circular overall, can have a pattern which differs from a circumference and emerges from said plane, for example a regular or irregular undulated pattern, with sinusoidal, square, rectangular, triangular or mixed waves.

The most outer additional cap can completely cover the traditional cap or leave its outer edge exposed and hence visible. The same can apply to any other additional cap with respect to the most inner additional cap. If the outer edge of all or part of the caps is visible, the plane tangential to the visible outer lateral surface of the caps is preferably roughly the same, so as not to have too accentuated steps or undercuts at the junction line, which would make cleaning more difficult.

BRIEF DESCRIPTION OF THE DRAWINGS

The invention will be more apparent from the ensuing description of some embodiments thereof given by way of example. In this description reference is made to the accompanying drawings, in which:

FIG. 1 is a cross-section through a cooking utensil according to the present invention, the cross-section being taken along the axis of the utensil, this latter being provided with only one additional cap (in this FIGURE and in the others, the dimensions of the capsular base in the direction perpendicular to the base have been increased compared with reality, for greater clarity);

FIG. 2 is a partial side elevation of just the right side of the utensil of FIG. 1;

FIG. 3 is a section similar to FIG. 1 but only partial, of a cooking utensil of the present invention presenting two additional caps;

DETAILED DESCRIPTION OF THE INVENTION

Figures 4, 5:
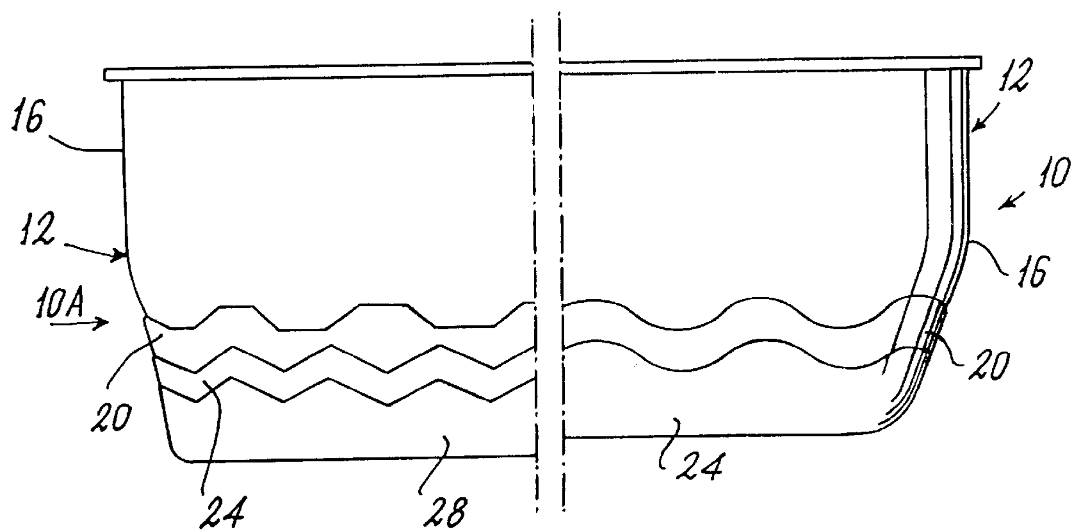
FIGS. 4 and 5 are side elevations of a utensil in accordance with FIGS. 1 and 2 respectively, but with a non-circular visible outer edge of the caps.

As can be seen from FIGS. 1 and 2, the cooking utensil 10 is composed of the actual utensil 12 of the usual stainless steel traditionally used for manufacturing cooking utensils, the actual utensil 12 having a base 14 and a side wall 16. As can be seen in particular from FIG. 1, the cooking utensil 10 presents a composite capsular base comprising, in addition to the stainless steel base 14 of the actual utensil 12, a layer 18 of a metal of good thermal conductivity, the layer 18 being interposed between the base 14 and the traditional outer cap 20 formed from the usual stainless steel for cooking utensils. Compared with the capsular base of conventional cooking utensils, the capsular base of the utensil 10 presents a further layer 22 of a metal having a melting point lower than that of the metal of the traditional cap 20 and of the metal of the additional cap 24, this latter being necessarily of high magnetic permeability type. In the specific example, as the two caps 20 and 24 between which the layer 22 is enclosed are made of the usual stainless steel for cooking utensils (of low magnetic permeability) and of a stainless steel of high magnetic permeability respectively, the metal of the layer 22 can conveniently be aluminium.

The composite capsular base of the cooking utensil 10 can be obtained by using a manufacturing method of the pressure heating type (obviously adapted to accommodate the additional cap in addition to the traditional cap). An alternative is to form the base of the utensil by simple brazing, in which case the layer 22 will be the brazing metal itself.

In the embodiment 10A of FIG. 3 (in which elements equal or similar to those of the cooking utensil 10 are indicated by the same reference numerals) a second additional cap 28 is provided. Assuming that the composite capsular base of the utensil 10A has been obtained by a method of the pressure heating type, the second additional cap 28 is joined to the first additional cap 24 by a layer of a metal 26 of melting point not exceeding that of the constituent metal of the two additional caps. From the viewpoint of magnetic induction heating efficiency it is advisable that the more outer additional cap 28 be of metal of high magnetic permeability, or possibly both the additional caps 28 and 24 be of this metal (for example a high magnetic permeability AISI 430 stainless steel).

However, as already stated high magnetic permeability stainless steel is less corrosion resistant than the usual stainless steel for cooking utensils, hence it could be convenient to form a cooking utensil in which the more outer additional cap is of a more corrosion resistant metal (for example a usual stainless steel for cooking utensils, or titanium which is known to be particularly corrosion resistant), whereas the more inner additional cap (which is therefore protected) is of a high magnetic permeability metal (in particular a stainless steel with this characteristic). Such a solution can be used even when the base is to be given a special appearance or colour. This is achieved for example by making the more outer cap of copper, titanium, brass, nickel or silver. In the case of a metal of high thermal conductivity there is also the advantage of uniformly distributing the heat immediately over the entire outer surface of the capsular base.

To obtain a cooking utensil of high magnetic induction heating efficiency, a cooking utensil can be conveniently formed provided with more than one additional cap of high magnetic permeability metal, in particular by making these additional caps very thin, so that capsular bases can be obtained with two, three or even more caps of high magnetic permeability.

According to a variant of the invention, one of the caps can be made using preformed composite plates consisting of several metal layers, of which at least one is of high magnetic permeability.

Figure 6:
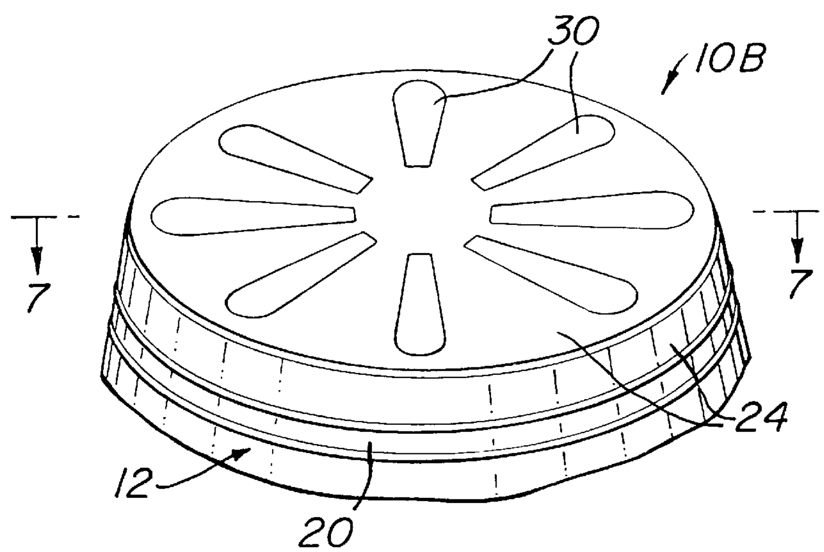
FIG. 6 is a perspective view showing a portion of the cooking utensil according to the present invention showing the cap thereof with apertures therein.
Figure 7:
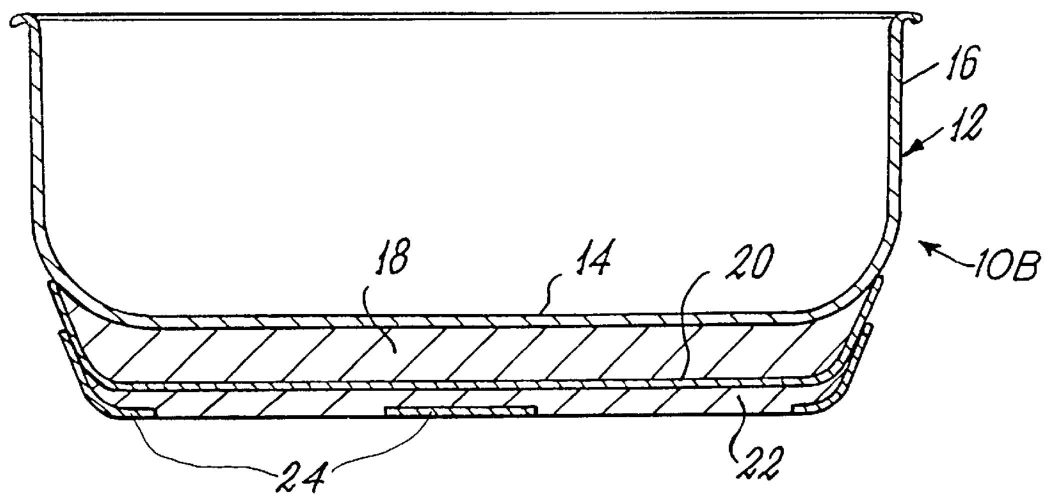
FIG. 7 is a sectional view of the cooking utensil taken along line 7—7 in FIG. 6.

As shown in FIGS. 6 and 7, stainless steel cooking utensil (10B) and as it has already been stated the most outer additional cap (for example the cap 24 of FIG. 1 and the cap 28 of FIG. 2) can present notches, apertures (30) or through holes of the most varied shapes, exposing the underlying metal which, if different (as is normally the case) from that of the relative additional cap, can crated decorative designs of motifs on the outer surface of the utensil base. This difference will for example be particularly evident if the most outer additional cap is of stainless steel and the underlying metal is a metal of decidedly different color, such as copper or brass.

With regard to the utensils of FIGS. 4 and 5 (in which elements equal or similar to those of the utensils of FIGS. 1 and 2 are indicated by the same reference numerals) the only difference consists of the fact that the outer edges of the various caps have a pattern which is different from circular. This pattern can be of the most varied shape while still consisting of a closed line which is circular overall, the only limitation being imposed by fantasy and feasibility.

What is claimed is:

1. A stainless steel cooking utensil comprising:

a capsular base, the capsular base having a stainless steel cap (20) and at least one additional metal cap (24; 24, 28), at least one of the caps (20, 24; 20, 24, 28) being of a metal of high magnetic permeability, said one additional cap (24) being drawn over a stainless steel cap (20), each of the other additional caps (28) being drawn at least over that adjacent additional cap (24) closer to the stainless steel cap (20), means (22; 22, 26) being provided to permanently fix the additional caps (24, 28) to each other and to the stainless steel cap (20).

2. A utensil as claimed in claim 1, wherein the most outer additional cap (24; 28) is of a metal of high magnetic permeability.

3. A utensil as claimed in claim 1, wherein the most outer additional cap (24; 28) is of a metal of high corrosion resistance.

4. A utensil as claimed in claim 1, wherein the additional cap (24) or the additional caps (24, 28) of high magnetic permeability are of a suitable stainless steel.

5. A utensil as claimed in claim 1, wherein a pressure heating procedure is used to form the capsular base but the caps are of a metal which does not in itself enable the caps to be permanently joined together by implementing that procedure, the means for connecting together the caps (20, 24; 20, 24, 28) consist of a layer (22; 22,26) of a metal interposed between two adjacent caps and having a melting point less than that of the metals of the relative caps.

6. A utensil as claimed in claim 1, wherein a brazing procedure is used to form the capsular base, the means for permanently connecting the caps together are the brazing material itself.

7. A utensil as claimed in claim 1, wherein at least one of the additional caps is formed from a preformed composite sheet consisting of several metal layers, of which at least one is of high magnetic permeability.

8. A utensil as claimed in claim 1, wherein the most outer additional cap (24; 28) presents through apertures.

9. A utensil as claimed in claim 1, wherein the pattern of the outer edge, if visible, of an individual cap (24, 20; 28, 24, 20) deviates from a circumference.

10. A utensil as claimed in claim 9, wherein the visible outer edge of a cap (24, 20; 28, 24, 20) has a regular or irregular undulated pattern.

11. A utensil as claimed in claim 1, wherein an additional cap completely covers all or part of the more inner caps.

12. A utensil as claimed in claim 1, wherein, the outer edge of all or part of the caps is visible, the plane tangential to the visible outer lateral surface of these caps is roughly the same.

13. A stainless steel cooking utensil comprising:

a capsular base, the capsular base having a stainless steel cap (20) and at least one additional metal cap (24; 24, 28), at least one of the caps (20, 24; 20, 24, 28) being of a metal of high magnetic permeability, said one additional cap (24) being drawn over a stainless steel cap (20), each of the other additional caps (28) being drawn at least over that adjacent additional cap (24) closer to the stainless steel cap (20), means (22; 22,26) being provided to permanently fix the additional caps (24,28) to each other and to the stainless steel cap (20); and wherein, the outer edge of all or part of the caps is visible, the plane tangential to the visible outer lateral surface of these caps is roughly the same.

* * * * *